June 10, 1952 H. W. BRELSFORD 2,599,689
SIGHT AND ACTION COVER FOR GUNS
Filed Oct. 6, 1947
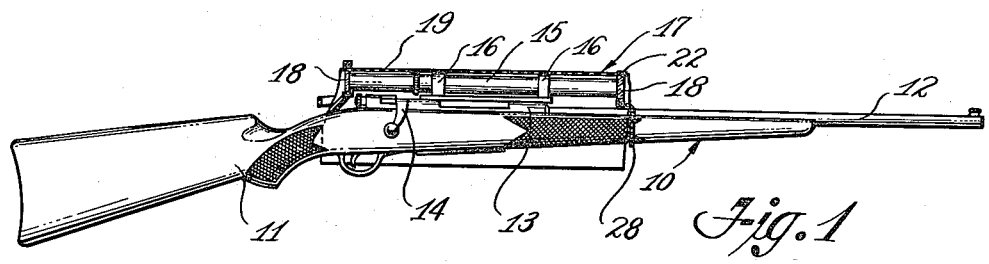
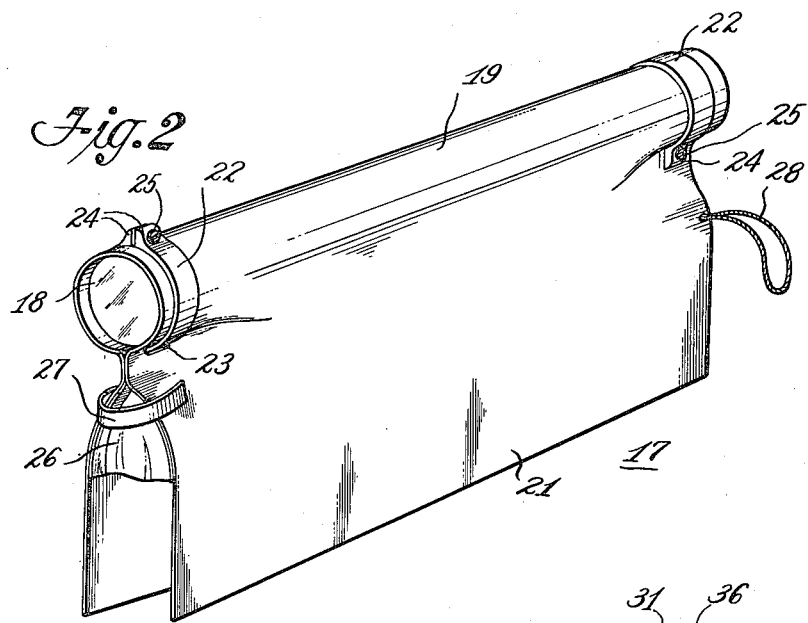
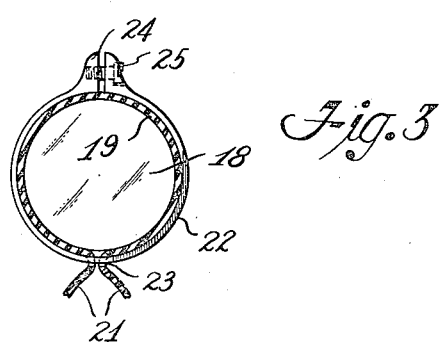
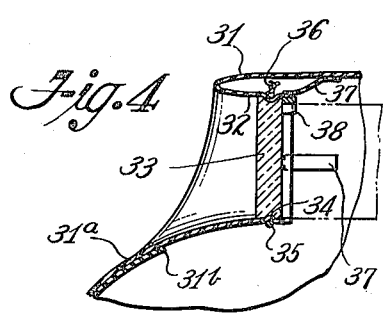
INVENTOR.
HARRY W. BRELSFORD
BY Harold W. Mattingly
Attorney Patented June 10, 1952

2,599,689

UNITED STATES PATENT OFFICE 2,599,689

SIGHT AND ACTION COVER FOR GUNS

Harry W. Brelsford, Santa Barbara, Calif.

Application October 6, 1947, Serial No. 778,082

9 Claims. (Cl. 42—1)

My invention relates to covers for telescopic sights attached to rifles, and has particular reference to a cover permitting the use of the sight and which also protects the action of the gun.

The use of transparent caps for telescopic sights is increasing, inasmuch as such caps protect the optical elements of the sight from dust, rain, and snow, and yet do not impede the use of the sight for quick or emergency shots wherein sufficient time may not be available to remove the caps. The widespread use of coated optical elements has increased this use of protective caps, since scratches on the coatings interfere with the functioning of the telescopes. Accordingly it is important to cover the telescopic sights so that dust and moisture will not collect thereon, thus eliminating the necessity of wiping the lenses or otherwise cleaning them.

It is also common to cover the action or receiver portions of guns to protect them from the elements, regardless of whether the guns have a bolt action, lever action, or pump action. Such gun covers protect the action from dust in dry weather, rain in wet weather, and snow in cold weather. Thus an action may remain fully oiled on a hunting gun, a condition not generally desirable. These action covers invariably have been of opaque material, necessitating removal of the cover before the sight of the gun could be employed, and generally also necessitating removal before the gun could be fired or the action manipulated.

My invention provides a transparent cover for the sights and actions of guns, and while it may be used on guns with iron sights, it has its greatest utility on guns employing telescopic sights. In the presently preferred embodiment, my cover includes rigid optical elements disposable on either end of a telescopic sight, which elements may be connected by a flexible sheet of material that is also preferably resilient. This sheet of material may have a general shape of an inverted U so as to drape over the telescope and action of the gun in a fashion similar to a cape. Thus the telescope is immediately available for instant use, and the cover not only protects the telescope, but the action of the gun as well.

It is therefore an object of my invention to provide a combined telescopic sight and action cover for a gun.

Another object of my invention is to provide a full-length telescopic sight cover having transparent optical elements disposed at each end of the sight so that the sight may be used with the cover in place.

Another object of my invention is to provide a telescopic sight and gun action cover having optical elements for emergency use of the sight while at the same time protecting the action.

A further object of my invention is to provide a combined telescopic sight and action cover permitting use of the telescopic sight and also manipulation of the gun action without removal of the cover.

Other objects and advantages of my invention will be apparent in the following description and claims, considered together with the accompanying drawings, in which Fig. 1 is an elevation view of a gun provided with a telescopic sight wherein the sight and action of the gun are protected by a cover embodying my invention;

Fig. 2 is a perspective view of the cover of Fig. 1;

Fig. 3 is a sectional view through one of the optical elements of the cover of Fig. 2; and Fig. 4 is a longitudinal sectional view through one of the optical elements of a modified form of my invention.

Referring to the drawings, a gun 10 may include a stock 11 to which may be secured a gun barrel 12 threaded into a receiver 13 which may have a bolt type of action including a bolt lever 14. My invention is applicable to any type of gun, however, including pump types of guns, lever action, and other types of actions.

The gun 10 may be provided with a sight 15 of the telescopic type which may be secured to the gun by the usual telescopic mounts 16. It is desirable to protect the telescopic sight 15 from dust, moisture, snow, etc., for the extension of the life of the optical elements thereof, and also for protection from the elements under severely adverse conditions so that the field of view through the telescope will not be distorted or diffused by dirt, rain, snow, or other interference. Also it is desirable to protect the action of the gun which is invariably disposed immediately below the telescope or a major portion of the telescope.

Mounted on the telescope 15 is a protecting cover 17 provided particularly in accordance with my invention, and which may include transparent optical elements 18 at either end of the cover interconnected by means of a cape 19 preferably of a flexible resilient sheet material. The cape 19 preferably has side walls 21 that extend over the action of the gun and thus protect the action from the elements when the gun is carried sight-side up, which is the usual position for carrying the gun during hunting or other use.

The optical elements 18 are preferably in the form of optical flats, although they could be in the form of lenses if optical correction for the telescope were desired. Accordingly the optical elements 18 may be in the form of disks of optical glass, or may be disks of any other suitable transparent material such as methyl methacrylate, allyl resins, or any other suitable material. The cape 19 may be formed of any type of flexible material such as oilcloth, leather, or treated fabric, but I prefer to use a resilient flexible material such as sheet rubber or various other of the organic plastics, of which vinyl chlorides, vinyl chloride-acetate, polystyrene, cellulose acetate, ethyl cellulose, chlorinated rubber, isomerized rubber, etc., are examples. Resilience is preferred for the material of the cape 19, inasmuch as this material may be slightly stretched to dispose the optical elements 18 over the ends of the sight 15 to thereby position the entire cover. The cover may then be removed by stretching the cape 19 slightly by a manual action to permit the removal of one optical element 18 from the sight 15. The cape 19 may be transparent, if desired, to permit ready inspection of the action of the gun.

While the cape 19 may be suitably cemented, vulcanized, or otherwise bonded to the optical elements 18, at present I prefer to reinforce any such bond, or to use in lieu thereof a clamping band, for example a band 22 passing completely around each optical element 18 and passing through slots 23 in the cape 19. The band 22 may terminate in upstanding ears 24 which may be drawn together by means of a screw 25. Inasmuch as the clearance between the eyepiece end of a telescopic sight and the actuated portions of a bolt action gun are extremely close, it may be desirable to dispose the ears 24 of the clamp 22 upon the upper part of the cover 17 for the rear optical element 18. The forward optical element, however, may be clamped in an "ears down" position, as illustrated.

While the rear and forward edges of the cape 19 immediately below the optical elements 18 may be joined together, I have illustrated in Figs. 1 and 2 the use of a gusset 26 for joining these two edges together in the region between the stock and the telescopic sight.

The cover 17 may be removed from the gun 10 and its sight 15 by manually grasping a convenient portion of the cover, for example the rear clamping band 22, and stretching the cape 19 until the cape is freed from one end of the telescopic sight. Thereafter the entire cover may be flipped clear of the gun for effecting a quick shot through unimpeded sights. However I have provided a loop 27 into which a user's finger may be inserted for obtaining a quick hold upon the entire cover, and the cape 19 may then be stretched until one optical element 18 is clear of the sight. The loop 27 may be secured to the cape 19 in any suitable manner as by sewing, riveting, cementing, or fusing. If desired, an attaching cord 28 may be secured to the forward end of the cover 17 to pass around the barrel or stock of the gun so that the cover will not be lost when quickly removed.

In operation, for attaching the cover 17 to the gun 10 the user may first dispose the optical element 18 over the forward end of the telescope 15, and may then pull upon the loop 27 or any other part of the rear end of the cover such as the clamping band 22 until the cape 19 is stretched sufficiently to permit the rear optical element 18 to be positioned over the rear end of the sight 15. The entire cover is then in position for serving its protective function, and the telescopic sight 15 and the receiver 13 of the gun will be fully protected from dust, rain, snow, or other types of undesirable circumstances. Inasmuch as the cape 19 is flexible, the user of the gun may grasp the stock immediately below the telescopic sight to carry the gun in the usual and customary manner. Inasmuch as the cape 19 may be made of transparent material, the user of the gun may at any time inspect the action visually to determine the condition of the safety, the closure of the bolt, etc., or the accumulation of dirt or dust on any part.

If it is desired to shoot the gun 10, the user thereof may manually grasp the loop 27 or the clamp ring 22 and stretch the cape 19 to free the rear optical element 18, whereupon the entire cover 17 may be freed from the gun. If, however, a quick shot is desired as in hunting and there is no time to remove the cover, or if the weather conditions are so severe that removal of the cover would subject the gun or its sight to undesired elements, the user may merely sight through the optical elements 18 of the cover and use the sight in its normal and intended fashion. In this connection it will be noted that the loose draping sides 21 of the cover permit the user to insert his trigger hand over the stock and into the trigger guard without interference or delay. Also, the loose draping nature of the cape permits manipulation of the action without interference so that an old shell may be ejected and a new cartridge inserted in the chamber of the gun. In this connection it will be noted that the ends of the cape 19 may project slightly past the outer ends of the optical elements 18 so as to serve as a sun, dirt, and moisture shield for these elements.

Referring to Fig. 4, there is illustrated a modified form of the invention which is particularly designed for long stroke bolt action guns wherein there is little clearance between the bolt action and the rear end of the telescopic sight employed on the gun. Accordingly, therefore, instead of forming the cape material as a straight tube, a cape 31 may be turned back upon itself at one end to form inwardly projecting ends 32. An optical element 33 may be inserted in the opening defined by these inturned edges, and if desired the optical element may have a circumferential recess 34 formed therein. The two edges 31a and 31b may be brought together at the lower end of the bottom part of the optical element 33, and may be suitably cemented to the optical element. If desired a reinforcing ring in the form of a wire 35 may be passed around the optical element to press the inturned edges 32 into the circumferential recess, and this wire may be secured by twisting the ends as at 36, or may be secured in any other desired fashion.

The inturned nature of the cape 31 of Fig. 4 disposes the joining edges 31a and 31b in alignment with the direction of movement of the bolt action of the gun so that the cover may be extended rearwardly of the optical element 33 any desired amount, and thus permit the bolt of a gun to be moved well past the rear of the optical element 33 without passing from the confines of the cover.

If the stretch of the cape 31 is utilized to maintain the cover on the gun, tabs 37 may extend from the inturned edges to the main body of the cape 31. Also if it is desired to center the optical element 33 over the end of the telescopic sight, a crescent shaped member 38 may be glued to the inner side of the optical element to act as a stop to downward movement over the telescopic sight.

Although I have described my invention with respect to specific embodiments thereof, I do not limit myself to these specific embodiments, since it is obvious that various modifications could be made therein without departing from the true spirit and scope of my invention. For example, the entire cape 19 could be made of a molded material such as rubber having suitable recesses into which the optical elements could be inserted by flexing the rubber. Also, as noted, no clamps may be needed around the optical elements. Further, as also noted, the invention may be applied to ordinary peep sights or iron sights, although this would not seem, at present, to be too desirable. Further, the optical elements of my invention could be in the form of coated optics, either flats or lenses, although it would not seem to be desirable at present to coat these optical elements. Nor is stretching of the cape a requirement, since gravity and the enclosing portions of the cape at the optical elements will secure the cover to the gun. Accordingly I do not limit myself to the specific embodiments illustrated, inasmuch as these are merely illustrative and not limiting or definitive of my invention.

I claim:

1. A gun cover for guns having an action and a telescopic sight comprising: a pair of transparent optical elements adapted to be disposed one on each end of the telescopic sight; and a resilient cape secured to the elements and adapted to drape downwardly to pass over the gun action.

2. A gun cover for guns having an action and a telescopic sight comprising: a pair of optical flats adapted to be disposed one at each end of the telescopic sight; and a cape in the general shape of an inverted U formed of flexible material and secured to the optical flats, whereby the straight portions of the U-shape will be loose and permit free access to the gun trigger and also free manipulation of the action.

3. A gun cover for guns having an action and a telescopic sight comprising: a pair of transparent optical elements disposable one on each end of the telescopic sight; and a cape of transparent material attached to the elements and adapted to pass over the action of the gun.

4. A gun cover for guns having an action and a telescopic sight comprising: a pair of transparent optical elements adapted to be disposed one on each end of the telescopic sight; and a cape of resilient sheet material disposed over the sight and the action and cemented to the flats and having a length less than the sight, whereby the entire cover is maintained in position by engagement of the elements with the sight.

5. A gun cover for guns having an action and a telescopic sight comprising: a pair of optical disks disposable one on each end of the telescopic sight; a sheet of flexible material interconnecting the disks and passing about each disk; and a clamping band disposed over each disk exteriorly of the sheet for securing the sheet to each disk.

6. A gun cover for a gun having an action and a telescopic sight comprising: a pair of optical disks having circumferential recesses; a sheet of flexible material interconnecting the disks and passing therearound; and a securing band passing around the disks exteriorly of the sheet so that the sheet will be pressed within the circumferential recess to lock the sheet to each disk.

7. A gun cover for guns having an action and a telescopic sight disposed above the action comprising: a pair of optical disks adapted to be disposed one at each end of the telescopic sight; a centering stop disposed on the inner surface of at least one disk so that the stop will contact one end of the telescopic sight and center said disk on that end; and a sheet of flexible material extending between the disks secured to each disk.

8. A gun cover for guns having an action and a spaced telescopic sight disposed above the action comprising: a pair of optical elements disposable one at each end of the telescopic sight; and a sheet of flexible material passing around each optical element and having two edges thereof joined together below at least one optical element to span the space between said one element and the gun.

9. A cover for a gun having an action and a telescopic sight disposed closely adjacent thereto comprising: a sheet of flexible material formed in a general U-shape and having at least one end turned inwardly upon itself; an optical element disposed in the interior opening of the inturned edges; and a juncture formed of the edges below the optical element to project substantially rearwardly of the optical element.

HARRY W. BRELSFORD.

REFERENCES CITED

The following references are of record in the file of this patent:

UNITED STATES PATENTS

| Number | Name | Date |
|---|---|---|
| 1,535,312 | Hosking | Apr. 28, 1925 |
| 2,364,340 | Bogg, Jr. | Dec. 5, 1944 |
| 2,461,792 | Weaver | Feb. 15, 1949 |

FOREIGN PATENTS

| Number | Country | Date |
|---|---|---|
| 74,933 | Austria | Nov. 11, 1918 |
| 235,290 | Germany | June 7, 1911 |
| 319,977 | Germany | Apr. 7, 1920 |